United States Patent Office

3,383,362
Patented May 14, 1968

3,383,362
PHENOL-TERPENE-CYCLIC POLYOLEFIN
POLYMER
Carlos T. Gonzenbach, Scotia, N.Y., assignor to Schenectady Chemicals, Inc., Schenectady, N.Y., a corporation of New York
No Drawing. Filed Apr. 5, 1965, Ser. No. 445,779
15 Claims. (Cl. 260—62)

ABSTRACT OF THE DISCLOSURE

A reaction product is made from (1) phenol or an alkyl phenol having an ortho or para position open, (2) a terpene, sesquiterpene, triterpene, dihydrotriterpene or low molecular weight propylene polymer and (3) a cyclic polyolefin other than (2). Reactant (3) is added last. The reaction is carried out in the presence of a Friedel-Crafts catalyst and preferably in solution in an aromatic, naphthenic or paraffinic hydrocarbon.

---

The present invention relates to the preparation of phenol containing resins.

It is an object of the present invention to prepare novel phenol resins.

Another object is to prepare novel compounds useful as tackifiers.

A further object is to prepare resins suitable for use as hot melt adhesives.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modification within the spirit and scope of the invention will become apparent to those skilled in the art from this detailed description.

It has been found that the objects of the present invention can be attained by forming reaction products of (1) phenol or an alkyl substituted phenol, or mixtures thereof, (2) at least one terpene, sesquiterpene, triterpene, dihydrotriterpene or low molecular weight propylene polymer and (3) a cyclic polyolefin not set forth as reactant (2). Reactant (3) can also be called a cycloalkylpolyene.

The phenolic reactant should have at least one ortho or para position open and preferably has at least two such positions open. The most preferred phenol is phenol per se. Other phenols which can be used include o-cresol, m-cresol, p-cresol, cresylic acid having a boiling range of 185–230° C., 2,5-xylenol, 3,5-xylenol, p-dodecyl phenol, p-tert-butyl phenol, p-tert-amyl phenol, o-tert-butyl phenol, o-sec-butyl phenol, p-ethyl phenol, o-isopropyl phenol, o-cyclohexyl phenol, p-cyclohexyl phenol, p-octadecyl phenol.

As reactant (2) there can be used terpenes such as alpha pinene, beta pinene, camphene, alpha fenchene, gamma fenchene, d-limonene, myrcene, alpha phellandrene, beta phellandrene, ocimene, thujene, allo-ocimene bornylene, delta-3-carene, alpha-terpinene, dipentene, sabinene, 2,4(8) menthadiene. Bicyclic terpenes such as alpha-pinene and beta-pinene are prefered. Mixtures of polymerizable terpenes can be used, e.g. a natural mixture such as turpentine or an artificially formulated mixture, e.g. a blend of equal parts by weight of alpha pinene and beta pinene. Certain terpene alcohols can be used such as terpineol.

In place of part or all of the terpene less preferably there can be used a sesquiterpene such as bisabolene, isocadinene, cadinene, selinene, giriazulene and vetivazulene or dihydrotriterpenes or triterpenes such as squalene or lupeol or dihydroterpene such as 2-para menthene, 3-para menthene.

As the low molecular weight propylene polymers useful as reactant (2) the preferred material is propylene tetramer (a dodecene) although there can be used propylene trimer, propylene pentamer or propylene hexamer. The preferred reactant (2) is a terpene, most preferably a bicyclic terpene as previously set forth.

As reactant (3) there can be used dicyclopentadiene, methyl cyclopentadiene dimer, vinyl cyclohexenes, e.g. 4-vinyl cyclohexene and 3-vinyl cyclohexene, bicycloheptadiene, cyclododecatriene, cyclooctadiene, cyclooctatriene, cycloheptadiene, cyclopentadiene and methyl cyclopentadiene. Dicyclopentadiene is the preferred reactant (3).

The reaction is carried out in the presence of a Friedel-Crafts catalyst. The Friedel-Crafts catalyst can be an acid such as hydrofluoric acid, sulfuric acid or phosphoric acid or it can be a Lewis acid such as aluminum chloride, aluminum bromide, boron trifluoride, boron trifluoride etherate, antimony pentachloride, antimony trichloride, ferric chloride, tellurium chloride, beryllium chloride, stannic chloride, titanium tetrachloride, tellurium dichloride, bismuth chloride, zinc chloride, aluminum iodide. The preferred catalyst is boron trifluoride.

The phenol is preferably employed in an amount of 1 to 3 moles per 5 moles of cyclic compound, e.g. dicyclopentadiene. However, as little as 0.1 mole of phenol can be used per 5 moles of dicyclopentadiene or the like and there can also be employed more than 3 moles of the phenol, e.g. up to 5 moles per 5 moles of dicyclopentadiene.

The terpene is preferably employed in an amount of 1 mole per mole of cyclic compound, e.g. dicyclopentadiene. The mole ratio of terpene to cyclic compound, however can be varied, e.g. from 1:5 to 5:1.

The Friedel-Crafts catalyst can be used in an amount of 0.1–2 moles, or even more, per 5 moles of cyclic compound, e.g. dicyclopentadiene.

Generally the reaction is carried out in a solvent, e.g. aromatic hydrocarbon, aliphatic hydrocarbons and naphthenes. Illustrative hydrocarbon solvents are benzene, toluene, xylene, heptane, hexane, octane, petroleum ether, cyclohexane, tetrahydronaphthlene (Tetralin), decahydronaphthalene (Decalin), trimethyl benzene, cycloheptane, tetramethyl benzene, and cumene, nonane, decane, cymene, ethyl benzene. Chlorinated aromatic hydrocarbons, e.g. chlorobenzene and dichlorobenzene can also be used as solvents. The amount of solvent is not critical and usually is from 0.5 to 8 times the total weight of the reactive monomers. Preferably the solvent is used in an amount in excess of the reactive monomers by weight. The hydrocarbon solvents usually boil between 40° C. and 205° C.

When xylene is employed as the aromatic solvent it sometimes takes part in the reaction with the cyclic polyolefin. Toluene will act in the same fashion but to a lesser extent. Benzene is completely inert. In the following examples in which the yields are reported as over 100% it is due to the fact that the xylene took part in the reaction. This xylene modification was particularly pronounced when bicycloheptadiene was employed as a reactant.

When the xylene takes part in the reaction the product has the same uses as when it is omitted, e.g. The resulting resins are useful as tackifiers for ethylene propylene-polyene terpolymers, as hot melt adhesives, etc.

The temperature of reaction can be widely varied, e.g. from −10 to +100° C. Usually it is between +10 and 70° C. The temperature should be such that the solvent is liquid and the reaction mixture is kept liquid. The temperature should not be above the boiling point of the solvent.

The resinous products of the present invention are generally solid at room temperature although in a few instances they are liquid.

They are useful as tackifiers for natural and synthetic rubber, e.g. rubbery butadiene-styrene copolymer. They are also useful as an antioxidant for natural and synthetic rubbers and as hot melt adhesives. They can be employed as molding materials, e.g. to mold a cup.

They can be employed to stabilize solid polymers of alpha monoolefins having 2 to 8 carbon atoms in the molecule, e.g. polyethylene, polypropylene, ethylene-propylene coypolymers, ethylene-butene-1 copolymer, ethylene-pentene-1 copolymer, ethylene-hexene-1 copolymer, polyisobutylene. Such solid polymers have molecular weights of 10,000 to 1,000,000 or even higher.

They are particularly useful as modifying and tackifying agents for sulfur vulcanizable ethylene-propylene-non conjugated polyene terpolymer rubbers, now known as "EPDM" rubbers. In such terpolymers the non conjugated polyene is usually 0.5 to 15% of the weight of the terpolymer and the ethylene and propylene are each 5 to 95% of the total weight of the terpolymer. Examples of such terpolymers are ethylene-propylene - dicyclopentadiene (55:42:3); ethylene-propylene-dicyclopentadiene (60:39:1). Typical non conjugated polyenes for making such terpolymers are pentadiene-1,4, alloocimene, dicyclopentadiene, methyl cyclopentadiene dimer, hexadiene-1,4, 5-methylene-2-norbornene, cyclooctadiene-1,5.

Unless otherwise indicated all parts and percentages are by weight.

In the examples all softening points were determined by the ball and ring method.

EXAMPLE 1

A tacky resinous material was prepared by the following procedure.

Eight moles of xylene and 1.25 moles of phenol were charged to a three neck reaction flask fitted with a mechanical stirrer, a thermometer and a condenser. The mixture was heated to 40–45° C. and 0.5 mole of boron trifluoride was bubbled through a subsurface sparger into the flask. Then 3 moles of alpha pinene was added dropwise while maintaining the temperature at 40–45° C. by means of a water cooled bath. Next 7 moles of dicyclopentadiene were added dropwise. Active agitation was maintained throughout the entire reaction. After a two hour total reaction time the reaction was stopped by adding an excess of water to the reaction mixture. The contents of the reaction flask were then heated to 80–85° C. with active stirring for 30 minutes. The agitation was stopped and the water layer separated. A second water wash followed. The washed polymerizate was then steam hardened to the desired softening point. A yield of 88% of a reddish-brown resin having a 97° C. softening point was obtained.

The same procedure as that employed in Example 1 was followed in the examples set forth in the table below. In the table the following abbreviations are used:

α–p for alpha pinene
β–p for beta pinene
d–l for d-limonene
DC for dicyclopentadiene
CD for cyclododecatriene
VC for 4-vinyl cyclohexene
P for propylene tetramer
BC for bicycloheptadiene
S for squalene
CO for cyclooctadiene In the table all proportions are set forth in moles. In all of the examples except Example 16 the solvent was 8 moles of xylene, the catalyst was 0.5 mole of boron trifluoride and the reaction temperature was 40–45° C. In Example 16 the solvent was 3 moles of xylene, the catalyst was 0.4 mole of boron trifluoride and the reaction temperature was 50–55° C. The difference in the softening points in Examples 10 and 11 was due to the use of a longer steam hardening time in Example 11. The yield in the examples is expressed in weight percent based on the reactive monomers. In all of the examples monomer A was phenol per se.

TABLE

| Example | Monomers (mole ratios) | | | | Percent Yield | Softening Point, ° C. |
|---|---|---|---|---|---|---|
| | A | B | C | D | | |
| 2 | 1.25 | α–p 4 | β–p 1 | DC 5 | 87 | 94 |
| 3 | 1.25 | α–p 5 | | DC 5 | 102 | (¹) |
| 4 | 1.25 | | d–l 5 | DC 5 | 88 | 72 |
| 5 | 1.25 | | β–p 5 | DC 5 | 82 | 112 |
| 6 | 0.13 | | d–l 5 | DC 5 | 83 | 73 |
| 7 | 1.25 | | d–l 5 | CD 5 | 62 | 83 |
| 8 | 1.25 | | d–l 5 | CD 5 | 60 | 100 |
| 9 | 1.25 | | d–l 5 | VC 5 | 57 | 105 |
| 10 | 1.25 | | d–l 5 | BC 5 | 126 | 55 |
| 11 | 1.25 | | d–l 5 | BC 5 | 109 | 74 |
| 12 | 1.25 | | d–l 4 | DC 6 | 95 | 102 |
| 13 | 1.25 | | β–p 5 | BC 5 | 117 | 93 |
| 14 | 1.25 | α–p 4 | β–p 1 | DC 10 | 78 | 123 |
| 15 | 1.25 | α–p 4 | β–p 1 | CD 5 | 75 | 73 |
| 16 | 1.00 | | S 1 | DC 1 | 93 | 69 |
| 17 | 1.25 | | P 5 | DC 5 | 67 | 54 |

¹ Liquid.

When mixtures of alpha pinene and beta pinene are employed as the terpene reactant in general the greater the proportion of beta pinene the higher the softening point of the resin formed providing the proportions of phenol and the cyclic olefin are kept constant.

As previously indicated the products of the present invention are particularly useful as tackifying agents for "EPDM" rubbers. Not only are the sulfur-vulcanizable EPDM rubbers stocks tackified so as to have remarkably good building tack but bodies or layers of such terpolymer stock so tackified can be bonded together by vulcanization in the conventional manner to yield a composite structure exhibiting outstanding adhesion at the interface, commonly referred to as cured adhesion.

The sulfur-vulcanizable EPDM rubber stocks joined by the phenol-terpene-cyclic polyene containing cement can be any of those known to the art, such as those set forth in United States Patents 2,933,480; 3,000,866; 3,063,973; 3,093,620; 3,093,621 and 3,136,739, British Patent 880,904 and Belgian Patent 623,698. Examples of such commercial terpolymers are those available under the trademarks "Royalene," "Nordel," "Enjay EPT" and "Dutral S70" made with dicyclopentadiene, 1,4-hexadiene, methylenenorbornene and 1,5-cyclooctadiene, respectively as the third monomer.

The tackifying and bonding cement comprises (A) an unvulcanized sulfur - vulcanizable ethylene-propylene-polyene terpolymer rubber of the type described above, (B) compounding and vulcanizing ingredients for the terpolymer rubber and (C) the novel phenol-terpene-cyclic polyolefin of the present invention.

In preparing the cement the compounded terpolymer rubber stock and the novel resin of the present invention are dissolved in a suitable volatile solvent, e.g. cyclohexane, gasoline, trichloroethylene or tetrachloroethylene and the other materials of the terpolymer stock are dissolved or dispersed in the solvent according to their solubilities. The terpolymer and the novel resin are usually present in the cement in proportions to give a weight ratio of resin to terpolymer rubber hydrocarbon of from 0.1:1 to 5:1.

A thin layer of the cement is applied to one or both surfaces of EPDM terpolymer rubber stock to be joined and a portion of the solvent evaporated from the coated surface or surfaces. The surfaces are then brought together with suitable pressure and the assembly vulcanized in known manner. One of the stocks being joined may already be vulcanized and hence the cement can be used to retread EPDM rubber tires with tread rubber made from EPDM.

The use of the resins of the present invention in tackifying cements is shown in the following examples taken from the faorementioned Eckert and English application.

EXAMPLE A

Sixty parts of EPDM rubber stocks having the following formulations:

|  | Royalene [1] stock | Nordel [2] stock |
|---|---|---|
| Rubber | 100 | 100 |
| SAF carbon black | 80 | 80 |
| Circosol 2 X H hydrocarbon extending oil | 50 | 50 |
| Zinc oxide | 5 | 5 |
| Stearic acid | 1 | 1 |
| MBT (mercaptobenzothiazole) | 0.5 | 0.5 |
| Tetramethylthiuram monosulfide (Monex) | 1.5 | 1.5 |
| Sulfur | 1.0 | 1.5 |
| Compounded Mooney (ML–4 at 212° F.) | 85 | |

[1] Registered trademark. The particular "Royalene" used in this example was an EPDM rubber made with dicyclopentadiene as the third monomer and had a Mooney (ML–4 at 212° F.) viscosity of 125, an iodine number of 13, and an ethylene-propylene weight ratio of 67:33.
[2] Registered trademark. The particular "Nordel" used in this example was an EPDM rubber made with 1,4-hexadiene as the third monomer, and had a Mooney (ML–4 at 212° F.) viscosity of 74, an iodine number of 13, and an ethylene-propylene ratio of 57:43.

were shaken overnight with 60 parts of the resin of Example 2 in 780 parts of cyclohexane. The mixtures were then further dispersed in the solvent by rapid mixing.

The products were smooth, black liquids of an easily pourable viscosity.

The tackifier cements prepared as described above were painted on unvulcanized EPDM stocks having the formulations just given. After two hours drying, tack was measured on the tackmeter. Cured adhesion pads were made and tested. The data obtained are presented below.

|  | Cement formulation | |
|---|---|---|
|  | A | B |
| Royalene [1] rubber stock | 60 | |
| Nordel 1070 [2] rubber stock | | 60 |
| Resin of example 2 | 60 | 60 |
| Cyclohexane | 780 | 780 |
| Relative Tack (under load of 600 grams) on— | | |
| Royalene stock | 100 | 24 |
| Nordel stock | 197 | 75 |
| Cured Adhesion (inch/min.) on— | | |
| Royalene stock | 0.014 | 0.026 |
| Nordel stock | 0.20 | 0.010 |

For footnotes, see previous table.

It will be seen that where the same EPDM rubber is used in the cement and in the stocks being joined excellent tack and cured adhesion are obtained but where the EPDM in the cement differs from that in the stocks being joined the cured adhesion is reduced.

EXAMPLE B

The following data show the effect on tack of variation of total solids and of resin to rubber ratio in the cement.

|  | Cement formulation | | | | | |
|---|---|---|---|---|---|---|
|  | A | B | C | D | E | F |
| Royalene stock (same as in Example A) | 6 | 4 | 6 | 8 | 2 | 6 |
| Resin of example 5 | 6 | 4 | 4 | 4 | 4 | 8 |
| Cyclohexane | 78 | 78 | 78 | 78 | 78 | 77 |
|  | Tackmeter values | | | | | |
| Relative Tack (600 g. load on Royalene stock of Example A | 100 | 28 | 21 | 15 | 46 | 86 |

EXAMPLE C

Cements were formulated as follows:

| | Parts |
|---|---|
| Terpene resin | 6 |
| Royalene stock (same as Example A) | 6 |
| Cyclohexane | 78 |

The cements were tested on the Royalene stock of Example A with the following results:

|  | Terpene Resin | | | |
|---|---|---|---|---|
|  | Ex. 2 | Ex. 3 | Ex. 4 | Ex. 5 |
|  | Tackmeter values | | | |
| Relative tack (600 g. load) on Royalene stock of Example A | 100 | 18 | 49 | 57 |

EXAMPLE 9

The following cements were formulated:

|  | Cement formulation | | | |
|---|---|---|---|---|
|  | A | B | C | D |
| Royalene stock | 6 | 6 | 6 | 6. |
| Terpene resin (6 parts) | Example 5 | Example 13 | Example 2 | Example 11. |
| Cyclohexane | 78 | 78 | 78 | 78. |
|  | Tackmeter values | | | |
| Relative tack (700 g. load) | 59 | 74 | 100 | 52. |

The Royalene stock used in the cement and bonded therewith was compounded as follows:

| | Parts |
|---|---|
| Royalene rubber (Mooney viscosity (ML–4 at 212° F.) of 95, iodine number 12, and ethylene-propylene ratio of 65:35) | 100 |
| SAF carbon black | 80 |
| RPO–5150 oil | 50 |
| Zinc oxide | 5 |
| Stearic acid | 0.75 |
| Monex | 1.5 |
| Sulfur | 1.25 |

What is claimed is:

1. Resinous reaction product of (1) 0.1 to 5 mols of a phenol selected from the group consisting of phenol and alkyl substituted phenols having at least one of the ortho and para positions open, (2) 5 mols of an unsaturated material selected from the group consisting of terpenes, sesquiterpenes, triterpenes, dihydrotriterpenes and low molecular weight propylene polymers, and (3) 1 to 25 mols of a cyclic polyolefin other than (2), wherein the reaction is carried out in the presence of a Friedel-Crafts catalyst and reactant (3) is added last.

2. Reaction product according to claim 1 wherein (3) is a member of the group consisting of cyclopentadiene, dicyclopentadiene, methyl cyclopentadiene, methyl cyclopentadiene dimer, vinyl cyclohexene, bicycloheptadiene, cyclooctadiene, cyclododecatriene and cyclooctatriene.

3. Reaction product according to claim 1 wherein (1) is phenol per se.

4. Reaction product according to claim 1 wherein (2) is a terpene.

5. Reaction product according to claim 4 wherein (2) is a cyclic terpene.

6. Reaction product according to claim 5 wherein (3) is dicyclopentadiene.

7. Reaction product according to claim 6 wherein (1) is phenol per se.

8. Reaction product according to claim 1 wherein (1) is phenol per se, (2) is pinene, and (3) is dicyclopentadiene.

9. Reaction product according to claim 1 wherein (1) is phenol per se, (2) is d-limonene, and (3) is dicyclopentadiene.

10. Reaction product according to claim 1 wherein (1) is phenol per se, (2) is pinene, and (3) bicycloheptadiene.

11. Reaction product according to claim 1 wherein (1) is phenol per se, (2) is propylene tetramer, and (3) is dicyclopentadiene.

12. Reaction product according to claim 1 wherein (1) is phenol per se, (2) is vinyl cyclohexene, and (3) is a terpene.

13. Reaction product according to claim 1 wherein (1) is phenol per se, (2) is cyclododecatriene, and (3) is a terpene.

14. Reaction product according to claim 1 including xylene as a chain terminating reactant, the xylene being added before (3).

15. Reaction product according to claim 14 wherein (1) is phenol per se, (2) is bicycloheptadiene, and (3) is a terpene.

References Cited

UNITED STATES PATENTS

| | | | |
|---|---|---|---|
| 2,343,845 | 3/1944 | Powers | 260—62 |
| 2,596,235 | 5/1952 | Geiger | 260—619 |
| 3,124,555 | 3/1964 | Brown et al. | 260—45.5 |

FOREIGN PATENTS

| | | |
|---|---|---|
| 1,364,247 | 5/1964 | France. |

WILLIAM H. SHORT, *Primary Examiner.*

M. GOLDSTEIN, *Assistant Examiner.*